United States Patent
Corey

[15] 3,686,937
[45] Aug. 29, 1972

[54] FLUIDIC DIRECTION AND VELOCITY DETECTION APPARATUS

[72] Inventor: Victor B. Corey, Bellevue, Wash.

[73] Assignee: United Control Corporation

[22] Filed: June 10, 1970

[21] Appl. No.: 45,016

[52] U.S. Cl..................73/189, 73/194 R, 137/81.5
[51] Int. Cl.............................................G01p 13/02
[58] Field of Search.....73/189, 194 R, 212; 137/81.5

[56] References Cited

UNITED STATES PATENTS

| | | | |
|---|---|---|---|
| 3,343,413 | 9/1967 | South et al. | 73/205 X |
| 3,364,741 | 1/1968 | Hickox | 73/189 |

*Primary Examiner*—Jerry W. Myracle
*Attorney*—Hofgren, Wegner, Allen, Stellman & McCord

[57] ABSTRACT

Fluidic detection apparatus for determining the direction and velocity of flow of an incident fluid flow stream. A jet stream producing means is disposed in axial spaced relation to a jet stream detector and initially disposed such that the common axis lies generally in the direction of flow of the incident fluid flow stream. Any deflection of the jet stream from its normal path, caused by the intersection therewith of the incident fluid flow stream, is detected by the jet stream detector and a servomechanism responsive thereto rotates the apparatus until the jet stream is aligned with the direction of the incident fluid flow stream. A second jet stream producing means and axially spaced jet stream detector are positioned 90° to the direction apparatus and are mounted for lateral translation by the servomechanism to detect the velocity of the same incident fluid flow stream.

6 Claims, 7 Drawing Figures

PATENTED AUG 29 1972

INVENTOR
Victor B. Corey

BY
Hofgren, Wegner, Allen, Stellman & McCord
ATTORNEYS

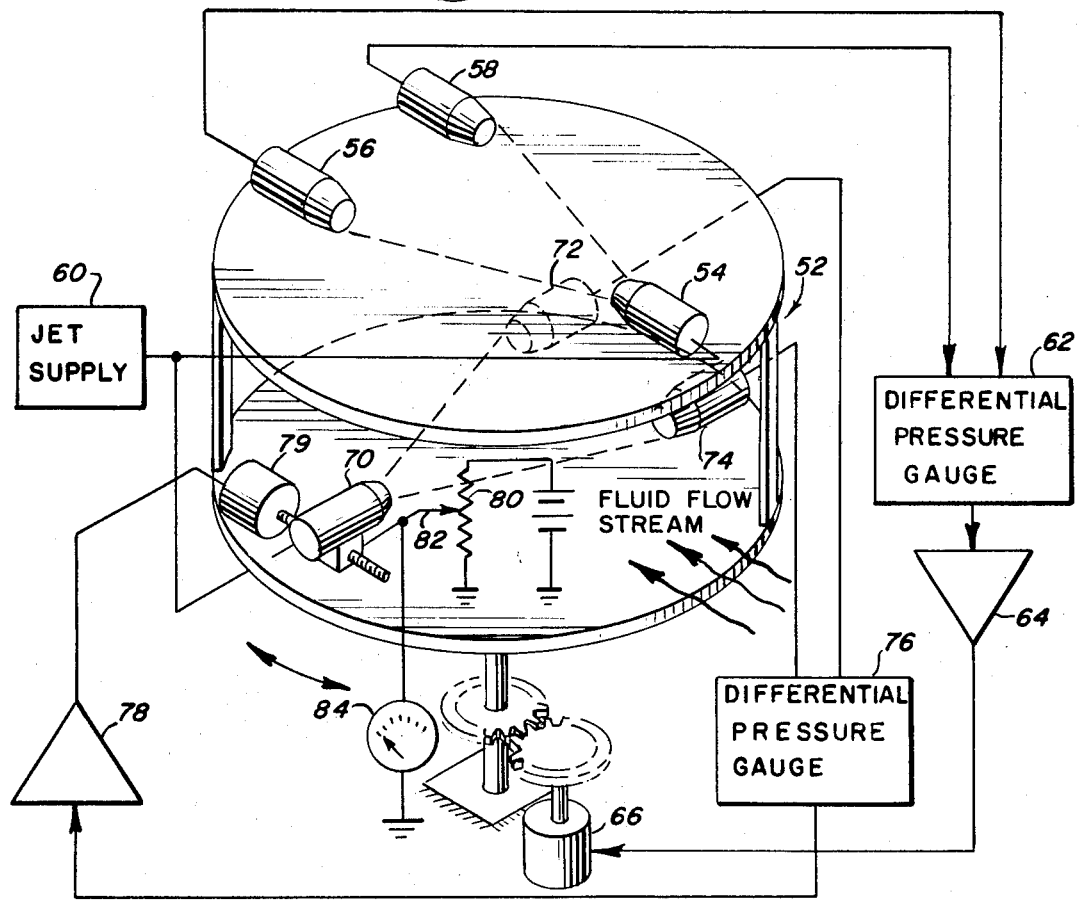
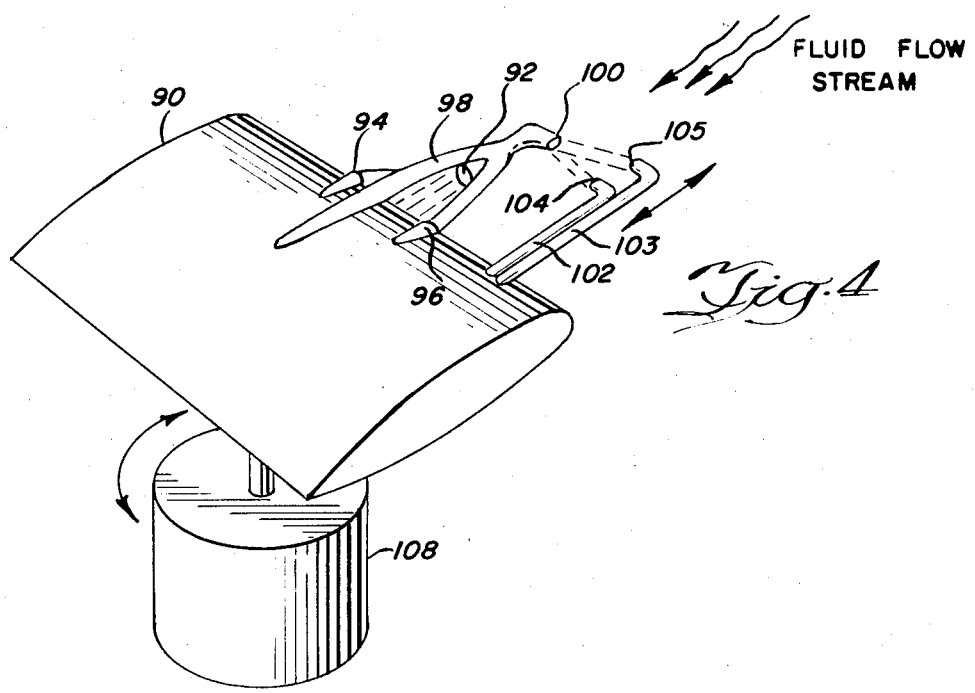

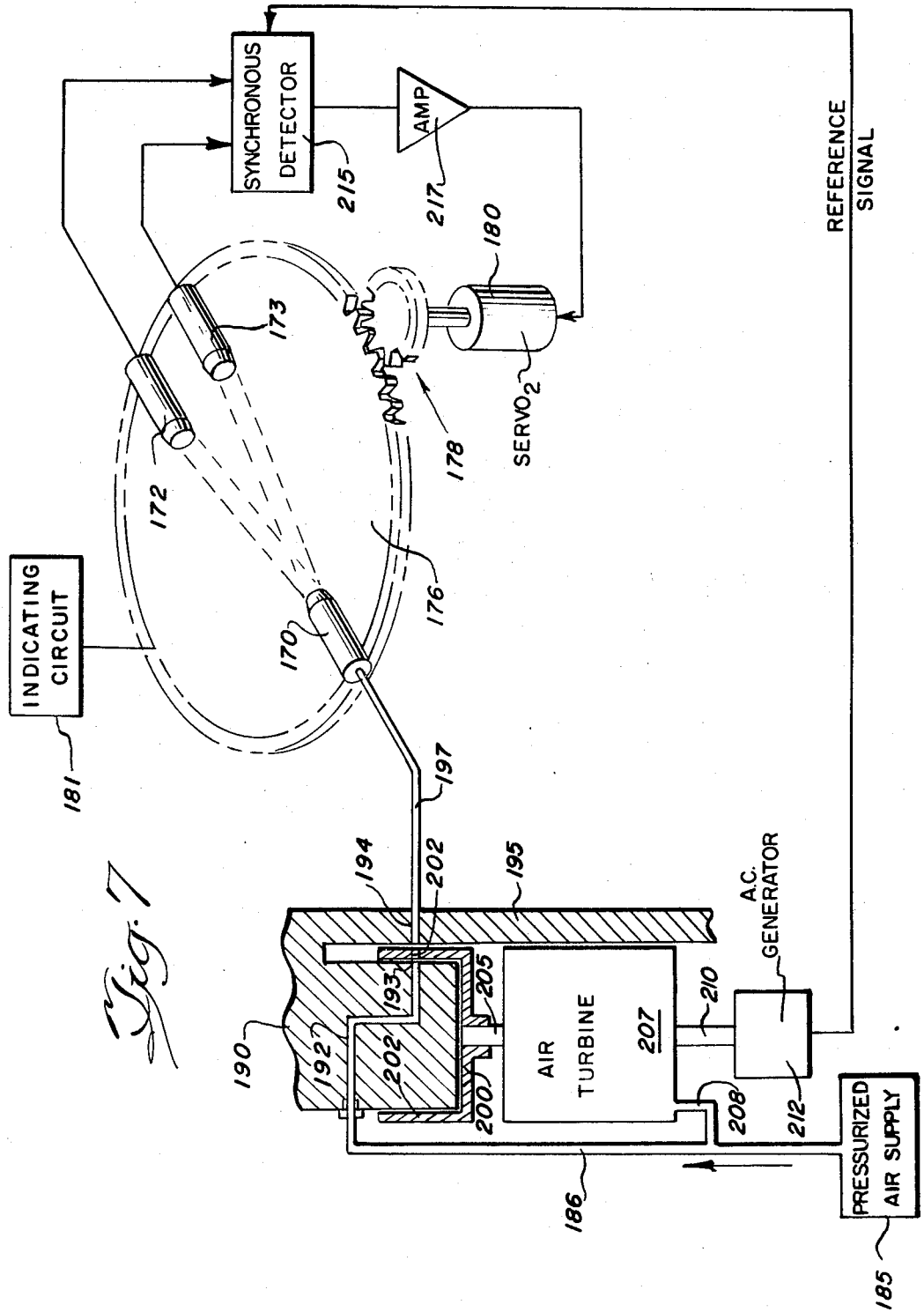

FLUIDIC DIRECTION AND VELOCITY DETECTION APPARATUS

BACKGROUND OF THE INVENTION

A number of different types of fluid flow stream indicating devices have been utilized in the prior art. Most of these devices compare the difference between ram pressure and static pressure in order to provide an indication of fluid flow velocity. The utility of such devices, however, is generally limited to application where the fluid flow stream velocity coincides with the direction at which the moving flow stream impinges upon the detection apparatus. As an example, the detection apparatus may be statically mounted with relation to earth as a reference, and the incident fluid flow stream might be wind or a moving liquid such as a river, stream or conduit.

On the other hand, the detection apparatus might be mounted on a vehicle which moves relative to an ambient fluid such as air, or in the case of liquids, water. However, because of the manner in which the measuring apparatus functions and the way in which the apparatus is mounted, particularly in the case of the moving vehicle, the measuring apparatus is only sensitive to the flow component which is directed parallel to the longitudinal axis of the vehicle. Whereas this type of measurement may be adequate for conventional aircraft, although the inaccuracy of such a system at low speeds is well known, such measuring apparatus is clearly inadequate in the case of vertical take-off and landing craft (VTOL), and helicopter type aircraft. In these types of aircraft, the direction of travel, particularly at low speeds, often does not coincide with the longitudinal axis of the aircraft.

In order to provide a true indication of air speed for these types of aircraft, it is necessary that the flow stream velocity sensing apparatus have its sensitive axis directed along the actual path of the moving fluid flow stream, rather than in the direction One of the principal problems with the velocity determining apparatus of the prior art was that the velocity of the incident flow stream was determined by comparing the ram pressure and static pressure thereof, using a Pitot tube fixedly mounted to project beyond a leading edge of the aircraft. This problem, however, has been overcome by a new type of fluidic velocity sensing apparatus which is disclosed in my copending application entitled "Fluidic Sensor For Fluid Stream Velocity," filed on even date herewith, and assigned to the assignee of the present invention. The device disclosed in the copending application does not depend upon a comparison of ram pressure and static pressure, and only requires that the sensitive axis of the detection apparatus be aligned with the actual direction of the fluid flow stream, the velocity of which is to be measured.

SUMMARY OF THE INVENTION

The present invention relates generally to fluid flow stream detection apparatus, and more particularly to a method and apparatus for determining the actual direction of a moving fluid flow stream, so that a true indication of the velocity thereof can be measured.

The velocity detection apparatus disclosed in the aforementioned copending application provides particular advantages for determining the actual velocity of a fluid flow stream which in its lowest range is relatively slowly moving, such as occurs when the apparatus is mounted on VTOL and helicopter type aircraft. The present invention provides a flow stream direction indicating means which is sensitive to the same low velocities, and which can be combined with the velocity detection apparatus and still maintain sensitivity to low velocity flow streams. These advantages occur because the present apparatus utilizes deflectable transmissions which can be adjusted to transmit through space at a very slow speed. This slow speed of transmission allows the fluid flow stream to act thereagainst for a substantially long period of time, thus bending the path of transmissions over a large angle for any given velocity of the fluid flow stream. The deviation is detectable even for fluid flow stream velocities as small as several knots (nautical miles per hour).

In accordance with the present invention, a jet stream of fluid such as air is directed toward a pair of pressure sensitive detector devices located opposite a jet nozzle and disposed symmetrical with relation to the axis of the jet nozzle, so that when an incident fluid flow stream has a flow direction coinciding with the axis of the jet nozzle, no pressure differential occurs between the two detector devices. However, when the incident fluid flow stream intersects the jet stream at an angle, the jet stream is deflected and the detectors will sense a pressure differential which is related to the angle of intersection of the fluid flow stream with the jet stream.

By providing an error signal producing means responsive to the differential pressure sensed by said detector means, a servomechanism can be controlled so as to continuously align the jet stream axis with the fluid flow stream direction. By coupling this apparatus with the velocity detection apparatus disclosed in the aforementioned copending patent application, a device may be provided which may be used to accurately sense the velocity of a fluid flow stream moving across any predetermined portion of a vehicle, independent of the structural characteristics of the vehicle.

It is therefore a principal object of the present invention to provide a fluidic flow stream direction sensing apparatus for accurately determining the actual direction of flow of a moving fluid stream.

Another object of the present invention is to provide a method and apparatus for determining the direction of flow of a moving fluid stream by utilizing transmissions which are easily deflectable by the fluid stream even when moving at very small velocities. The direction determination may be used to align the sensitive axis of a velocity determining apparatus.

Still another object of the present invention is to provide a combination direction-velocity determining apparatus by using only fluidic detection principles.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

BRIEF DESCRIPTION OF THE DRAWINGS

FIG. 3 is a schematic illustration of a fluid flow stream direction and velocity determining apparatus in accordance with the present invention;

FIG. 4 is a perspective view showing the embodiment of FIG. 3 contained in an aerodynamic housing;

FIG. 7 is a partly perspective and partly plan view illustrating a further embodiment of the fluid flow stream direction determining apparatus, using synchronous detection.

DESCRIPTION OF THE PREFERRED EMBODIMENTS

Figure 1:
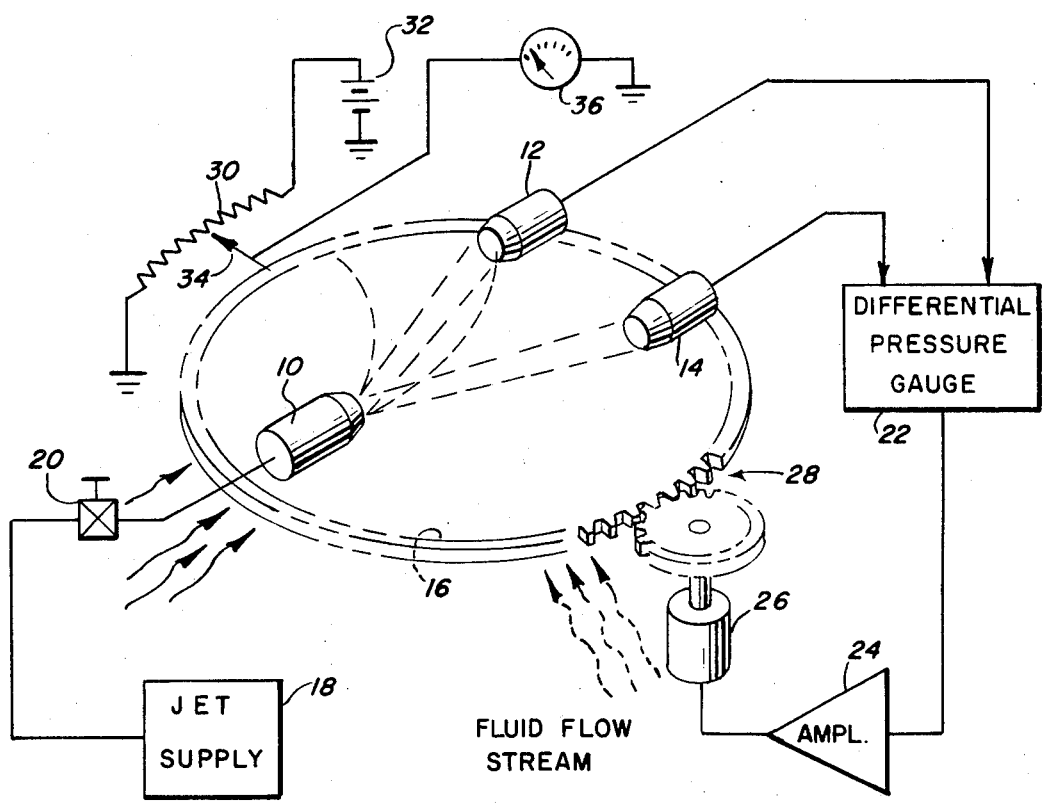
FIG. 1 is a schematic illustration of a fluid flow stream direction determining apparatus in accordance with the present invention.

Referring now to FIG. 1 of the drawing, there is shown an illustrative schematic diagram of a fluid flow stream direction detection apparatus in accordance with the present invention. A jet supply nozzle 10 is shown fixedly mounted relative to a pair of receiver nozzles 12 and 14 respectively, the three being relatively mounted on a platform 16, which facilitates positioning of the detection structure relative to the incident fluid flow stream, the direction of which is to be detected.

Connected to the jet nozzle 10 through suitable tubulation, is a jet supply source 18, the flow rate of which may be regulated by a valve means 20. In order to detect the pressure conditions produced in the nozzles 12 and 14 by the jet stream transmissions being emitted from nozzle 10, a differential pressure gauge means 22 is operatively connected to the nozzle means 12 and 14. The pressure gauge 22 provides an output which is proportional to the difference in pressure sensed by the detector nozzles 12 and 14. This signal is then amplified by a suitable amplifying means 24 and fed to a servo means 26 for causing rotation of the platform 16 through drive means 28. The illustrated supportive structure is of course only representative in nature and is not necessarily the same as that used in practicing the invention.

In order to enable transmission of the detected fluid flow stream direction to some remote point, a potentiometer means 30 is utilized to provide an electrical signal responsive to the positioning of the platform 16. The potentiometer 30 is energized by a voltage supply means 32, and upon movement of the arm 34, which is responsive to rotation of the platform 16, a controlled signal is provided for driving a meter 36 to remotely indicate the detected fluid flow stream direction.

In operation, the valve 20 would be opened so as to allow a stream of jet fluid to be supplied to the nozzle 10 by the jet supply means 18, for direction towards the receiver nozzles 12 and 14. Should equal pressures be detected by the receivers 12 and 14, no difference in pressure will be detected by the gauge 22 and thus no signal will be provided to servo 26 for repositioning the apparatus carrying platform 16. However, should unequal pressures be detected in the receivers 12 and 14, as would be the case if the fluid flow stream were to have a direction as indicated by the dashed arrows, so as to divert the jet stream as shown in dashed, curved lines, the pressure gauge 22 would produce a control signal which would drive the servo unit 26 and cause the platform 16 to be rotated counterclockwise until an equal pressure condition was sensed in the nozzles 12 and 14. This condition would only exist when the jet stream was directly aligned with the incident fluid flow stream.

Preferably, the fluid forming the jet stream is the same as the fluid of the flow stream. For example, when used on an aircraft to determine direction of air flow, jet supply 18 is a source of air. In appropriate applications, this allows the fluid for the jet stream to be supplied by the flow stream being measured, by channeling a portion of the flow stream to nozzle 10.

While the jet transmitter 10 has been illustrated in its preferred form as being located upstream from receiver nozzles 12 and 14, the jet transmitter 10 may be located downstream from the receivers, with the jet stream being directed upstream towards the receivers. With such inverted geometry, the velocity of the jet stream must be sufficient to overcome the velocity of the moving fluid flow stream, in order that at least a portion of the jet stream reaches detector nozzles 12 and 14.

Figure 2:
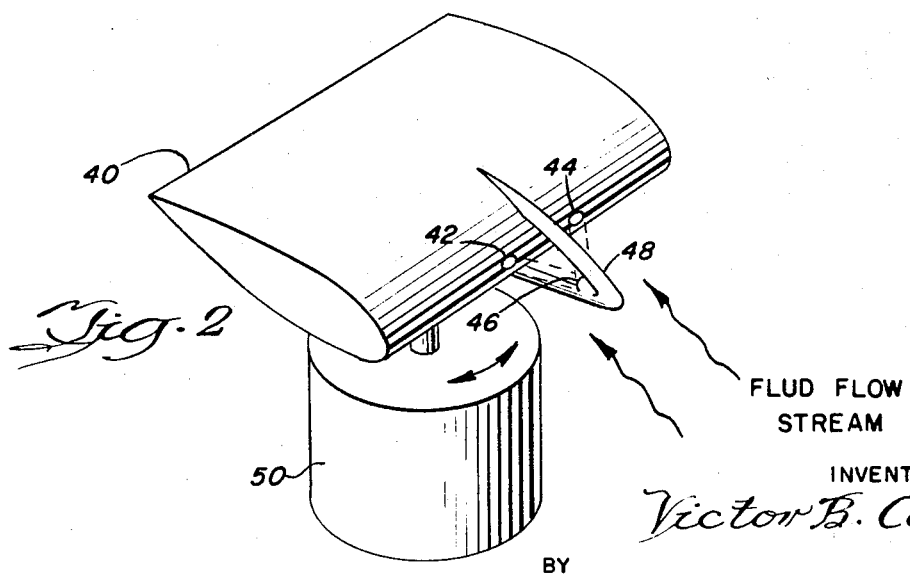
FIG. 2 is a perspective view showing the embodiment of FIG. 1 contained in an aerodynamic housing.

In FIG. 2, there is shown one form in which the apparatus of FIG. 1 may be embodied for application to an aircraft or other vehicle. The rotatable platform in this instance is in the shape of an air foil 40 and includes a pair of orifices 42 and 44 in the leading edge thereof to accommodate the receiver nozzles. The jet nozzle 46 is mounted ahead of the leading edge of the housing 40 on an aerodynamically designed support structure 48, positioned along an axis intermediate the receiver orifices 42 and 44. The housing 40 is shown rotatively mounted to a base member 50, which may be a portion of the vehicle structure.

Turning now to FIG. 3 of the drawing, there is shown a schematic illustration of a fluid flow stream velocity detection apparatus incorporating the directional detection structure of the present invention. In order to illustrate the interrelationship between the combined apparatus, the structure is diagrammatically illustrated as including a two-level rotatable platform structure 52. Shown mounted on the upper level of the structure 52 is a jet nozzle 54 and a pair of receiver nozzles 56 and 58. Fluid is supplied to jet nozzle 54 from a jet supply means 60 for producing a jet stream which can be detected by the nozzles 56 and 58, which are operatively coupled to a differential pressure gauge means 62.

As described above, when the directional detection apparatus senses a fluid flow stream direction which is non-parallel to that of the jet stream being emitted from the jet nozzle 54, a differential pressure is detected by gauge 62, thus producing an error signal which is amplified by an amplifier 64, so as to drive the servomechanism 66 and cause the platform 52 to be rotated so as to reorient the directional detection means until its sensitive axis is parallel with the fluid flow stream direction.

Also mounted on a second level of the support structure 52 is a fluidic velocity detection apparatus of the type described in the aforementioned copending application. This velocity detection apparatus includes a jet nozzle means 70, which, when supplied with fluid from jet supply means 60, causes a jet stream to be passed through the incident fluid flow stream for detection by the receiver nozzles 72 and 74. The nozzles 72 and 74 are operatively connected to a differential pressure gauge means 76, which, upon sensing a difference in pressure in the nozzles 72 and 74, causes an error signal to be generated which is amplified by an amplifying means 78 so as to drive the servo means 79 for repositioning the jet nozzle 70. The nozzle 70 is caused to move either upstream or downstream of the incident fluid flow stream until the pressure difference sensed in the nozzles 72 and 74 by the differential pressure gauge 76 is cancelled and no error signal is produced thereby.

In order to provide a remote indication of the position of the nozzle 70, which is directly related to the velocity of the fluid flow stream, a potentiometer means 80 is provided having an arm 82 responsive to the position of the nozzle 70, so as to cause a velocity calibrated meter 84 to be energized in accordance therewith and thus provide an accurate indication of the fluid flow stream velocity.

The combined apparatus of FIG. 3 provides the advantages of fluidic detection principles for both the direction and velocity determinations. Thus, the device is especially adaptable for use in VTOL and helicopter type aircraft, in which the fluid air stream flowing pass the aircraft may be moving at very small velocities, which prior combination direction and velocity determining apparatus would be incapable of detecting. Certain modifications may be made in the combined apparatus without departing from the teachings of the invention. For example, in place of the translatable jet nozzle 70, multiple fixed jet nozzles can be spaced along the longitudinal axis of the screw shaft from servo means 80. As a pressure differential is sensed, the air stream from jet supply 60 can be switched to another jet nozzle until equal pressures are obtained at the receiver nozzles 72 and 74.

In FIG. 4 there is illustrated one form in which the direction and velocity sensing apparatus schematically illustrated in FIG. 3 might be embodied. As in the embodiment illustrated in FIG. 2, the mechanical portions of the system are housed in an air foil member 90 and the directional detection means includes a jet nozzle orifice 92 and a pair of receiver nozzle orifices 94 and 96. The jet nozzle 92 is mounted between the orifices 94 and 96 and spaced therefrom by an aerodynamically shaped support member 98, the forwardmost projection of which is extended to house the jet nozzle 100 for the velocity determining apparatus. Also projecting from the leading edge of the housing member 90 is a pair of side-by-side second projections 102, 103 respectively forming the receiver nozzles 104, 105. The projections 102, 103 are mounted for longitudinal movement into and out of the housing 90, in order to translate the receivers 104, 105 relative to the jet nozzle 100.

In the embodiment of FIG. 4, the receiver nozzles are translatable rather than the jet nozzle as in FIG. 3. Therefore, the velocity determining potentiometer should be coupled with its wiper connected to move with movement of the projections 102, 103 in order to change the resistance thereof in accordance with movement of the receiver nozzles. The resulting output would then indicate the velocity of the fluid flow stream, as in FIG. 3.

In a manner similar to that shown in FIG. 2, the housing 90 is rotatably mounted to a portion 108 of the superstructure of the carrying vehicle. The operation of this embodiment is substantially identical to that described with relation to FIG. 3, the principle difference being that the velocity sensing portion thereof is placed upstream of the direction detection apparatus, rather than being positioned immediately therebeneath, and the velocity receivers rather than the jet transmitter are made movable.

Figure 5:
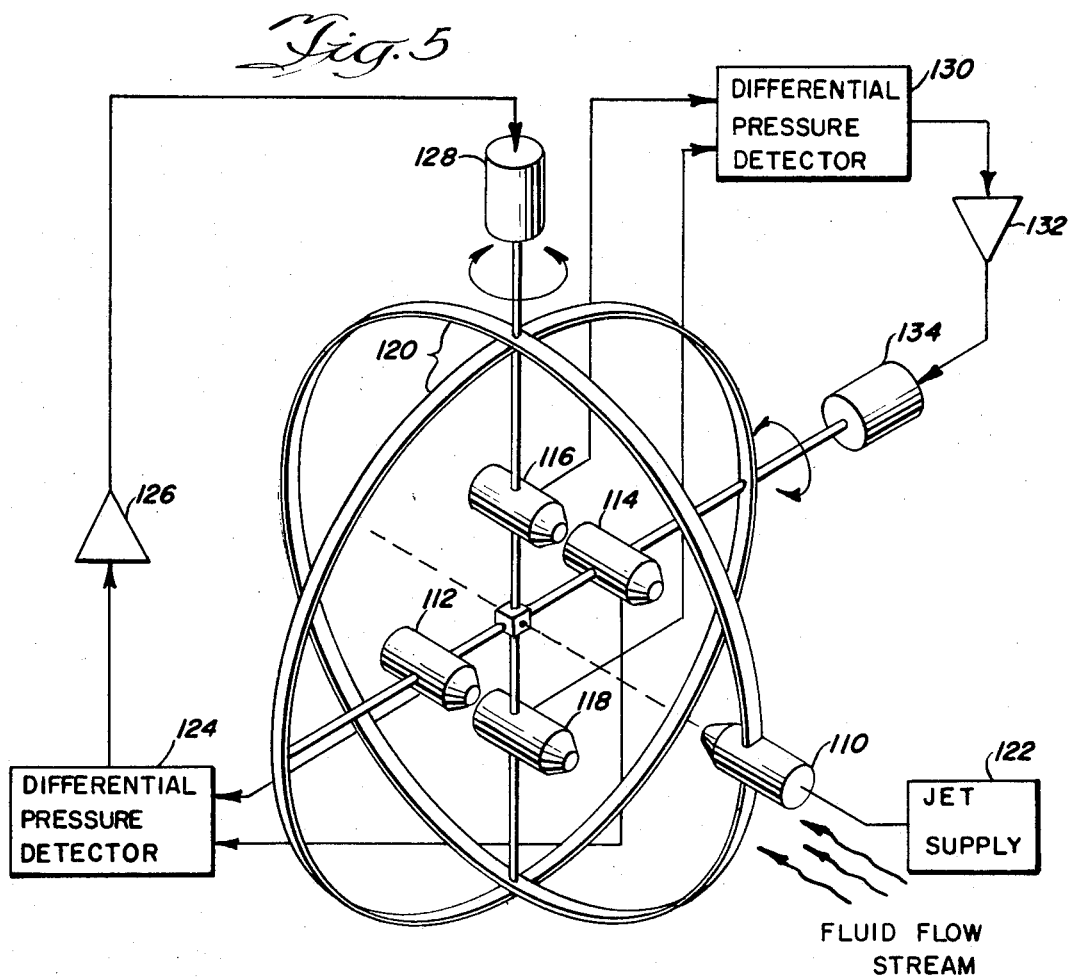
FIG. 5 is a still further embodiment of a fluid flow stream direction determining apparatus in accordance with the present invention.

In FIG. 5 of the drawing, there is shown a still further embodiment of a fluidic directional sensing apparatus in accordance with the invention. This embodiment is essentially comprised of a pair of directional sensing devices such as is illustrated in FIG. 1, mounted at 90° relative to each other and sharing a common jet supply nozzle 110. More specifically, the apparatus is comprised of a pair of detector nozzles 112 and 114 for detecting rotational components about a Y axis and a pair of receiver nozzles 116 and 118 for detecting rotational components of direction about an X axis. This direction detection apparatus is mounted on a gimble structure 120, so as to provide two degrees of freedom of directional detection. A jet supply means 122 is provided for causing a jet stream to be emitted from jet nozzle 110 for direction towards the receivers 112, 114, 116 and 118.

The receiver nozzles 112 and 114 are operatively connected to a differential pressure detector 124 for sensing directional components about the Y axis and producing an error signal which is amplified by amplifier 126 for controlling a servo 128 for revolving the detector structure about the Y axis. The detector nozzles 116 and 118 are operatively connected to a differential pressure detector 130 for sensing directional components about the X axis and producing an error signal responsive thereto which is amplified by an amplifier 132 for controlling a servo means 134 and causing the gimble structure 120 to be rotated about the X axis. In accordance with this embodiment of the invention, the actual direction in three-dimensional space of any flowing fluid stream could be accurately detected and instantaneous changes in the direction thereof could be instantaneously followed.

Figure 6:
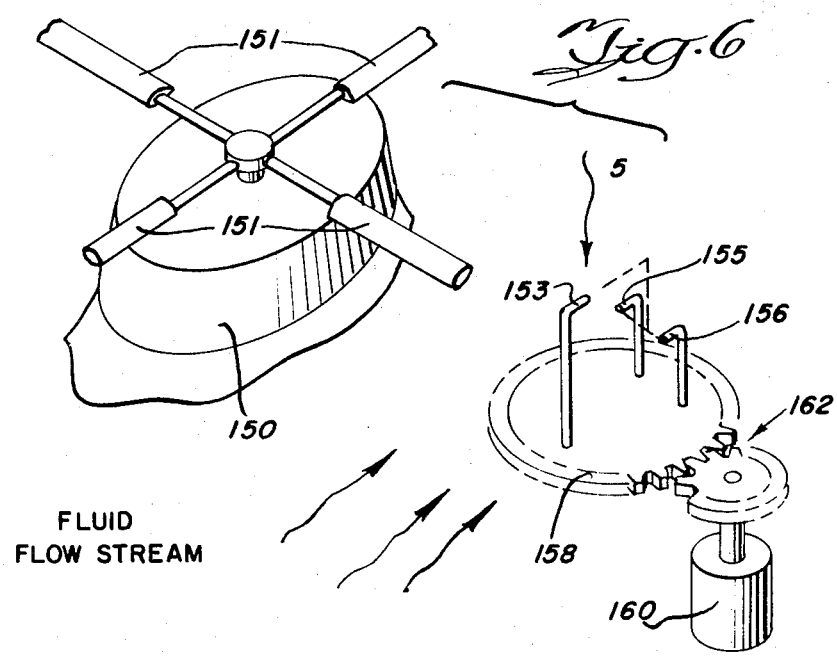
FIG. 6 is a schematic diagram illustrating another embodiment of the invention, similar to the embodiment of FIG. 1, and in which the detection apparatus is provided with a steady state offset to compensate for the downwash from the rotor of a helicopter.

In FIG. 6, another exemplary form of the invention is illustrated, similar to the form shown in FIG. 1. The before described combination direction and velocity sensors are sensitive to fluid flow streams moving in a plane parallel to the planar level of the transmitter and receivers. Should the fluid flow stream have a velocity component which is perpendicular to the plane of measurement, it is possible for the jet streams to be deflected out of the planes of measurement.

The direction determining apparatus of FIG. 1, modified as illustrated in FIG. 6, solves the problem of perpendicular velocity components. Should the fluid flow stream have a direction component S which is perpendicular to the plane of measurement, it is possible for the jet stream to be deflected out of the plane of measurement. For example, in a helicopter 150, the rotor blades 151 create a perpendicular air stream component in the form of a down-draft S under the rotor, which can bend the jet stream out of the measurement plane.

To compensate for air stream component S, the plane of the transmitter jet 153 is elevated above the plane of the two pressure receivers 155 and 156. The distance of elevation is of an amount sufficient to compensate for the presence of down-draft S, which otherwise would deflect the jet stream so that the receivers located in the plane of the jet transmitter might not be able to sense a usable signal. The amount of elevation is selected taking into account the range of jet velocities to be employed and the range of down-draft velocities S to be encountered. Except as it affects the level of the usable signal available at the receivers 155 and 156, the magnitude of the down-draft component S does not enter into the measurement of the fluid stream velocity.

As previously related in FIG. 1, the jet supply nozzle 150 and the receiver nozzles 155 and 156 are fixedly mounted on a platform 158. The transmitter and receivers are connected in the same manner as illustrated in FIG. 1, in order to produce an output signal which is fed to servo means 160 for causing rotation of the platform 158 through drive means 162. While only the direction determining apparatus has been illustrated, it will be apparent that the velocity determining apparatus previously described may also be mechanically ganged with the platform 158 in order to orient the velocity determining apparatus perpendicular to the fluid flow stream. In such a case, the velocity determining apparatus would be similarly provided with a steady state offset, so that the jet stream from its transmitter nozzle would impinge upon its receiver nozzles.

The steady state offset illustrated in FIG. 6 will usually be sufficient for the range of down-drafts encountered from helicopter rotor blades. Although changes in the down-draft velocity S will occur, the jet stream reaching the receivers 155 and 156 will have a sufficient magnitude to provide a usable signal. Should the velocity component S normal to the plane of measurement have a widely varying magnitude, so that a single steady state offset is not sufficient, additional servo drive means may be provided to translate the transmitter jet nozzle 153 vertically in the drawings, i.e., along an axis normal to the plane of measurement, until the jet stream is again within the range of receivers 155 and 156.

In FIG. 7, the direction determining apparatus of FIG. 1 has been modified to generate a modulated fluid jet stream, so that the advantages of synchronous detection may be used on the detected jet signal. A jet nozzle 170 is disposed opposite a pair of receiver nozzles 172 and 173. The transmitter 170 and the receivers 172 and 173 are fixedly mounted to a movable platform 176 which is rotated through drive means 178 by a servo means 180. An indicating circuit 181 is responsive to the amount of rotation of the platform 176 to indicate the direction of the fluid flow stream. The indicating circuit 181 may be the same as the potentiometer circuit illustrated in FIG. 1.

Jet transmitter 170 is supplied with a fluid jet that is modulated so as to generate a series of regularly spaced pulses. Pressurized fluid is supplied from a source of pressurized air supply 185 and is connected through a tubing 186 to a solid housing 190 having a hollow, tubular channel 192 therein with an opening in coaxial alignment with tubing 186. The opposite end of channel 192 terminates in an aperture 193 opening into a hollow section within housing 190. A second tubular, hollow channel 194 provided in a wall 195 of housing 190 connects coaxially with a tubing 197 which supplies air to jet nozzle 170. The channel 194 is coaxial with the aperture 193 in channel 192 and with the tubing 197 so that pressurized fluid from aperture 193 will pass to the nozzle 170 to form the fluid jet stream.

In order to modulate the fluid jet stream, a cup-shaped member 200 is disposed between channel 194 and aperture 193. Cup 200 includes a plurality of radially extending apertures 202 spaced equally around the periphery of the cup 200, and located at the same height as the aperture 193 and channel 194. The cup 200 is affixed to a shaft 205 which is rotated by an air turbine 207 having an input 208 connected to the pressurized air supply 185.

When supply 185 is effective, the turbine 207 is supplied with pressurized air and begins to rotate at a high speed, thereby rotating cup 200 and causing each of a plurality of apertures 202 to pass adjacent the channel 194. As each aperture 202 is rotated in coaxial alignment with channel 194, pressurized air passes via channel 194 and tubing 197 to nozzle 170 to generate a jet pulse. As the aperture rotates further, the cup 200 blocks the supply of pressurized air and thus terminates the jet until the next aperture 202 is rotated into coaxial alignment. Thus, the jet supply for nozzle 170 is modulated at a regular rate corresponding to the number of apertures 202 per unit of time passing adjacent the channel 194.

Air turbine 207 has an additional shaft 210 which is connected to an AC generator 212 to generate an AC electric output or reference signal having a frequency directly proportional to the rate of rotation of the turbine 207, which in turn is directly related to the modulation rate of the jet from nozzle 170. The AC generator 212 thus has a frequency which is directly proportional to the number of pulses per unit of time emitting from nozzle 170.

In place of the differential detector previously used, a synchronous detector 215 has a pair of inputs connected to the receivers 172 and 173. In addition, an input reference signal is supplied from AC generator 212. Detector 215, per se, operates in a known manner using synchronous detection techniques, so that all input signals from receivers 172 and 173 are disregarded except those having precisely the frequency of the modulated jet stream. The difference between such detected signals is used to form an error signal which is amplified by an amplifier means 217 and used to drive the servo 180, as previously described. In this manner, the advantages of synchronous detection are applied to the present invention, to improve the signal-to-noise ratio of the system.

As will be readily apparent to those having skill in the art, such apparatus will have a wide range of utility in areas wherein it is required that the direction or direction and velocity of a flowing fluid stream be measured. Although the specific embodiment disclosed herein is described as being suitable for gaseous condition, it should be apparent that the apparatus will likewise be adaptable for use in applications wherein the fluid flow stream is a liquid. Furthermore, it is contemplated that for certain applications it may be desirable to utilize an aromatic or other gaseous fluid in the jet means which can be detected by suitable gas detector means, rather than the pressure sensitive means disclosed herein.

I claim:

1. Apparatus for determining the direction and velocity of an incident fluid flow stream, comprising:
    velocity determining means having a first fluid jet stream directed along an axis exposed and movable with respect to said fluid flow stream, said jet stream deviating in direction when the flow stream is incident thereon, said velocity determining means detecting the deviation of said jet stream for determination of the actual velocity of the flow stream only when said axis is at a predetermined angular relation with respect to the direction of said incident flow stream;
    direction determining means having a second fluid jet stream along an axis normal to said first axis and exposed to said flow stream, the fluid of said second jet stream being composed of the same substance as the fluid of said first jet stream, said direction determining means detecting the deviation of said second jet stream for producing an indication of the direction of said incident fluid flow stream; and
    means responsive to said direction indication for moving said axes until said first axis is substantially perpendicular with respect to the indicated direction of said incident fluid flow stream.

2. The apparatus of claim 1 wherein both said velocity determining means and direction determining means includes fluid pressure sensitive means having an output proportional to the deviation of the jet stream from a direction along the axis corresponding thereto, the output of the pressure sensitive means from said direction determining means being coupled to said moving means to control rotation of said first and second axes.

3. The direction detecting apparatus of claim 2 wherein said velocity determining means includes servo means for relatively moving the first jet stream with respect to the pressure sensitive means therefor, null seeking means controlling said servo means and coupled to the output of said last named pressure sensitive means for producing said relative motion until the magnitude of the relative motion is directly proportional to the velocity of said flow stream, and means responsive to said magnitude of relative motion for indicating the velocity of said flow stream.

4. Apparatus for determining the direction and velocity of an incident fluid flow stream, comprising:
    first jet means for emitting a first fluid jet stream along a first axis;
    first fluid detector means spaced from said first jet means along said first axis for producing a first signal output varying as the first jet stream deviates in direction from said first axis;
    second jet means for emitting a second fluid jet stream along a second axis;
    second fluid detector means spaced from said second jet means along said second axis for producing a second signal output varying as the second jet stream deviates in direction from said second axis;
    means responsive to said first signal output for orienting said second axis perpendicular to the direction of said fluid flow stream; and
    means responsive to said second signal output for relatively laterally displacing said second jet means and said second detector means until the displacement bears a direct proportional relation to the velocity of the fluid flow stream.

5. The apparatus of claim 4 wherein the fluid composing said first jet stream and said second jet stream is the same as the fluid of said incident fluid flow stream.

6. The direction detecting apparatus of claim 4 wherein said second detector means includes at least two pressure sensitive means symmetrically disposed with respect to said second axis, said laterally displacing means moving said second jet means until the pressure sensed at pressure sensitive means on opposite sides of said second axis are equal.

* * * * *